(12) United States Patent
Lans

(10) Patent No.: US 9,694,307 B2
(45) Date of Patent: Jul. 4, 2017

(54) FILTER ASSEMBLY AND FILTER ASSEMBLY MANUFACTURING METHOD

(75) Inventor: Erik Lans, Trosa (SE)

(73) Assignee: CAMFIL AB, Stockholm (SE)

( * ) Notice: Subject to any disclaimer, the term of this patent is extended or adjusted under 35 U.S.C. 154(b) by 147 days.

(21) Appl. No.: 14/427,584

(22) PCT Filed: Sep. 12, 2012

(86) PCT No.: PCT/EP2012/067746
§ 371 (c)(1),
(2), (4) Date: May 15, 2015

(87) PCT Pub. No.: WO2014/040615
PCT Pub. Date: Mar. 20, 2014

(65) Prior Publication Data
US 2015/0246308 A1    Sep. 3, 2015

(51) Int. Cl.
*B01D 46/00* (2006.01)
*B01D 46/12* (2006.01)
*B01D 46/52* (2006.01)

(52) U.S. Cl.
CPC ..... *B01D 46/0001* (2013.01); *B01D 46/0002* (2013.01); *B01D 46/0005* (2013.01);
(Continued)

(58) Field of Classification Search
CPC ............ B01D 46/0001; B01D 46/0002; B01D 46/0005; B01D 46/125; B01D 46/521
See application file for complete search history.

(56) References Cited

U.S. PATENT DOCUMENTS 2,857,017 A   10/1958   Nutting
3,494,113 A   2/1970   Kinney
(Continued)

FOREIGN PATENT DOCUMENTS

CN   1668363 A   9/2005
CN   1679994 A   10/2005
(Continued)

OTHER PUBLICATIONS

International Search Report mailed Feb. 7, 2013, for PCT/EP2012/067746.
(Continued)

*Primary Examiner* — Robert Clemente
(74) *Attorney, Agent, or Firm* — Harness, Dickey & Pierce, PLC

(57) ABSTRACT

The present invention relates to a filter assembly comprising at least one media pack arranged in a frame structure in which the at least one media packs is pleated and having opposing first and second open ends, and a corresponding method for manufacturing such a filter assembly for removing particles from an air stream. The method for manufacturing a filter assembly for removing particles from an air stream said comprises for each media pack sealing the first and second open ends in a first molding step, thereby providing a sealed first edge and a sealed second edge of each respective media pack, and subsequently arranging the at least one media pack in the frame structure and in a second molding step securing and sealing the sealed first edge and the sealed second edge, respectively, to at least one frame element of the frame structure.

12 Claims, 5 Drawing Sheets

(52) U.S. Cl.
CPC ......... *B01D 46/125* (2013.01); *B01D 46/521* (2013.01); *B01D 2271/00* (2013.01)

(56) References Cited

U.S. PATENT DOCUMENTS

| | | | |
|---|---|---|---|
| 4,364,751 A * | 12/1982 | Copley | B01D 46/0068 55/302 |
| 4,732,675 A | 3/1988 | Badolato et al. | |
| 5,487,767 A | 1/1996 | Brown | |
| 5,512,074 A | 4/1996 | Hanni et al. | |
| 5,584,988 A | 12/1996 | Hashimoto et al. | |
| 5,618,419 A | 4/1997 | Fuerst | |
| 5,728,292 A | 3/1998 | Hashimoto et al. | |
| 6,248,155 B1 | 6/2001 | Seaman | |
| 6,279,570 B1 | 8/2001 | Mittelstadt et al. | |
| 6,447,566 B1 | 9/2002 | Rivera et al. | |
| 6,485,538 B1 | 11/2002 | Toyoshima | |
| 6,955,696 B1 | 10/2005 | Ost et al. | |
| 2003/0085167 A1 | 5/2003 | Fox et al. | |
| 2003/0145568 A1 | 8/2003 | Hodge | |
| 2004/0074387 A1 | 4/2004 | Jaisinghani | |
| 2004/0159598 A1 | 8/2004 | Fox et al. | |
| 2004/0238434 A1 | 12/2004 | Fisher et al. | |
| 2005/0217488 A1 | 10/2005 | Tanahashi et al. | |
| 2006/0150816 A1 | 7/2006 | Jaisinghani | |
| 2006/0163121 A1 | 7/2006 | Fisher et al. | |
| 2006/0180534 A1 | 8/2006 | Fox et al. | |
| 2007/0187303 A1 | 8/2007 | Fisher et al. | |
| 2007/0204577 A1 | 9/2007 | Devine et al. | |
| 2007/0204578 A1 | 9/2007 | Sundvik et al. | |
| 2008/0045135 A1 | 2/2008 | Pfannenberg | |
| 2009/0193773 A1 | 8/2009 | Sundvik et al. | |
| 2010/0236203 A1 | 9/2010 | Suzuki et al. | |
| 2010/0307118 A1 * | 12/2010 | Kawano | B01D 39/1692 55/483 |
| 2011/0067368 A1 | 3/2011 | Handley et al. | |
| 2012/0011817 A1 | 1/2012 | Borkent et al. | |
| 2012/0067013 A1 | 3/2012 | Antony et al. | |
| 2012/0067323 A1 | 3/2012 | Patwardhan et al. | |
| 2013/0067875 A1 | 3/2013 | Hartmann et al. | |

FOREIGN PATENT DOCUMENTS

| | | |
|---|---|---|
| CN | 101229463 A | 7/2008 |
| CN | 101234276 A | 8/2008 |
| CN | 202398240 U | 8/2008 |
| CN | 201461157 U | 5/2010 |
| CN | 101868291 A | 10/2010 |
| DE | 2739815 A1 | 9/1978 |
| DE | 20002124 U1 | 4/2000 |
| DE | 102010016504 A1 | 10/2011 |
| EP | 0082106 A2 | 6/1983 |
| EP | 1582248 A1 | 10/2005 |
| ES | 2551876 | 11/2015 |
| GB | 2364256 A | 1/2002 |
| JP | H06262020 A | 9/1994 |
| JP | 2008253886 A | 10/2008 |
| WO | WO-0051712 A1 | 9/2000 |
| WO | WO-0160137 A1 | 8/2001 |
| WO | WO-0197946 A1 | 12/2001 |
| WO | WO-03013690 A1 | 2/2003 |
| WO | WO-2004069374 A1 | 8/2004 |
| WO | WO-2008001396 A1 | 1/2008 |
| WO | WO-2010151542 A2 | 12/2010 |
| WO | WO-2010151580 A1 | 12/2010 |

OTHER PUBLICATIONS

Chinese Office Action dated Dec. 3, 2015 issued in corresponding Chinese Application No. 201280075771.6 (with translation).
Chinese Search Report dated Nov. 10, 2015 issued in corresponding Chinese Application No. 201280075771.6.
Chinese Office Action dated Dec. 3, 2015 issued in corresponding Chinese Application No. 201280075763.1 (with translation).
Chinese Suppl. Search Report dated Aug. 5, 2016 issued in corresponding Chinese Application No, 201280075763.1.
Second Chinese Office Action dated Sep. 2, 2016 issued in corresponding Chinese Application No. 201280075763.1 (with translation).
Chinese Search Report dated Nov. 17, 2015 issued in corresponding Chinese Application No. 201280075763.1.
U.S. Office Action dated Oct. 4, 2016 issued in co-pending U.S. Appl. No. 14/427,522.
U.S. Office Action dated Nov. 4, 2016 issued in co-pending U.S. Appl. No. 14/427,392.
U.S. Appl. No. 14/427,605, filed Mar. 11, 2015.
U.S. Appl. No. 14/427,609, filed Mar. 11, 2015.
U.S. Appl. No. 14/427,392, filed Mar. 11, 2015.
U.S. Appl. No. 14/427,522, filed Mar. 11, 2015.

\* cited by examiner

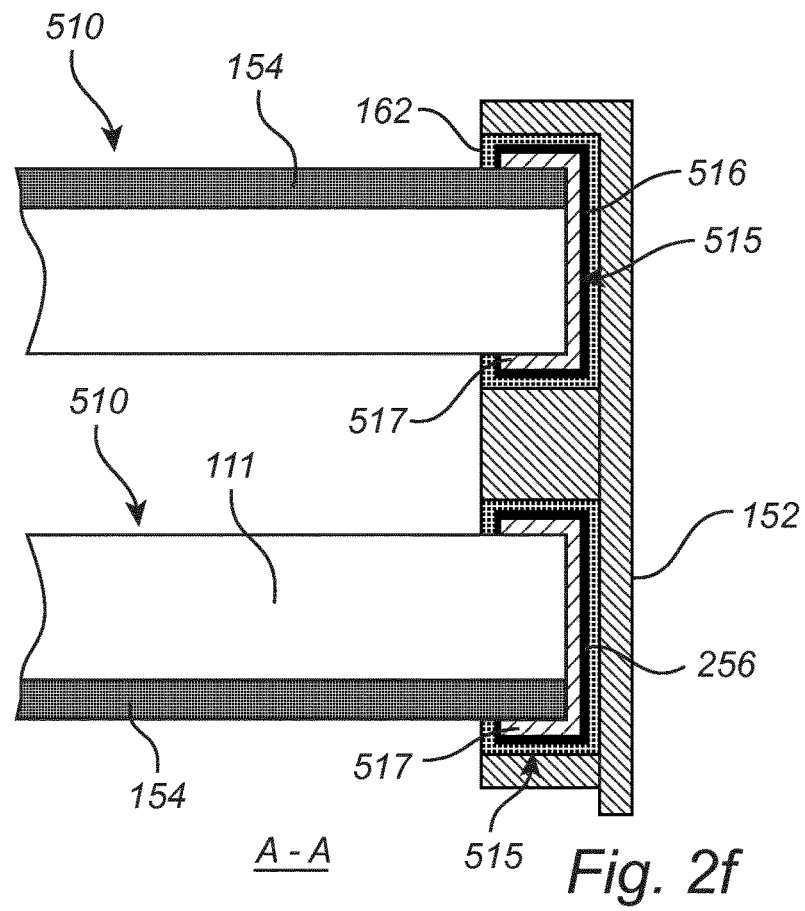
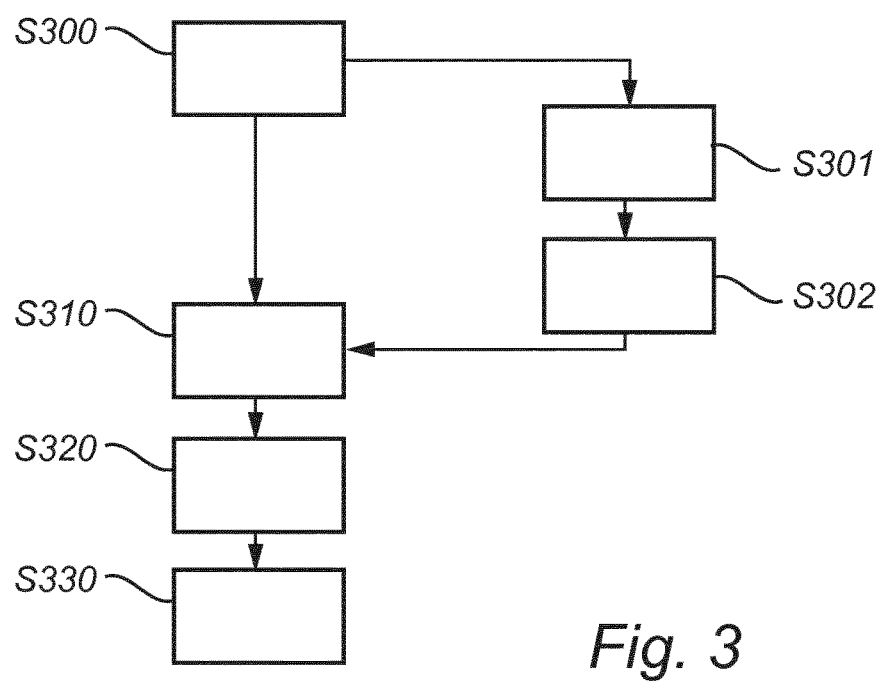

FILTER ASSEMBLY AND FILTER ASSEMBLY MANUFACTURING METHOD

CROSS-REFERENCE TO RELATED APPLICATIONS

This is a National Phase Application of PCT/EP2012/067746 filed Sep. 12, 2012, the entire contents of which is hereby incorporated by reference.

FIELD OF THE INVENTION

The present invention relates to filter assemblies for removing particles from an air flow, and more particularly to a filter assembly comprising pleated media packs arranged in a frame structure, and a corresponding method for manufacturing such a filter assembly.

BACKGROUND OF THE INVENTION

Filter assemblies comprising pleated media packs disposed in a frame structure are known. A pleated filter pack is typically formed from a sheet of filter media, e.g. a fiberglass sheet, or a nonwoven polyester sheet, which is pleated to increase the effective filtering area of the filter body. To provide mechanical support and/or to combine a plurality of media packs, the media pack is typically arranged in a frame structure. To prevent air from bypassing the filtering area of the media pack as it flows through the filter assembly, the edges of the media pack need to be sealed against the frame structure.

Herein, edges of the filter media pack having accordion like folds are generally referred to as open ends of the filter media pack. Edges of the filter media pack at the first and last pleat are referred to as closed ends. A known method to seal open ends when arranging media packs in the frame structure of the filter media pack is shown in US 2007/0204578 A1, which discloses a filter assembly comprising a pleated filter media pack which is arranged in a frame structure. The frame structure comprises a top panel and a bottom panel at which open ends of the pleated filter media pack are adhered and sealed by means of an adhesive, like a hot melt or other filter securing adhesive applied to the top and bottom panels of the frame assembly. After the adhesive is applied to the top panel and to the bottom panel of the frame structure, the open ends of the pleated media pack are subsequently put in contact with the adhesive as the filter assembly is mounted. The adhesive is then allowed to cure. This manner of sealing the media pack to the housing generally may provide a reliable seal, but requires a substantial amount of raw material, i.e. adhesive, and is time consuming to perform.

SUMMARY OF THE INVENTION

It is an object of the present invention to provide an improved method for manufacturing a filter assembly, which eliminates, or at least reduces the above mentioned and other drawbacks. This object and other objects are achieved by a method according to the present invention. This object and other objects are also achieved by a filter assembly. Preferred embodiments of the present invention are defined in the dependent claims.

Thus, in accordance with a first aspect of the present invention there is provided a method for manufacturing a filter assembly for removing particles from an air stream comprising at least one media pack arranged in a frame structure. The media pack is pleated and has opposing first and second open ends. The method comprises for each media pack: sealing the first and second open ends in a first molding step, thereby providing a sealed first edge and a sealed second edge of each respective media pack, and subsequently arranging the at least one media pack in the frame structure and in a second molding step sealing the sealed first edge and the sealed second edge, respectively, to at least one frame element of the frame structure.

The method is advantageous in that a stepwise sealing of the whole filter assembly is achieved. This simplifies the manufacturing process of the filter assembly and increases the yield. In the first molding step the open ends of the media pack is provided with a sealing layer, forming sealed edges of the media pack, which may be allowed to completely cure before the filters are mounted into the frame structure. The sealed edges further increases the mechanical stability of the media packs, which thereby facilitates the precision of the mounting of the filters into the frame structure. Subsequently, the sealed edges are sealed and fastened to the frame structure in the second molding step.

In accordance with an embodiment of the method of the invention, the second molding step comprises providing a second molding compound layer in at least one frame element of the frame structure such that at least one sealed edge of the at least one media pack is embedded in the second molding compound layer, and curing the second molding compound layer. Since the open ends of the media packs are already provided with sealed edges, the required amount of molding compound in the second molding step to provide a controlled sealing against the frame structure is substantially decreased. This in turn decreases the required curing time for the second molding step for instance when utilizing adhesives, or other applicable molding compounds, having curing times that are dependent on the thickness/amount of material of the molding compound layer.

In accordance with an embodiment of the method of the invention, the first molding step comprises for each open end of the media pack: providing a pot which is adapted to receive at least the open end, arranging the open end and a first molding compound layer in the pot, and curing the first molding compound layer. The open end is embedded in the molding compound layer. The pot advantageously increases the stiffness of the sealed edge. Further, the pot is arranged to provide a controlled outer edge profile of the sealed edge, which facilitates the mounting of the filters in the frame structure, e.g. by providing positioning features.

In embodiments of the invention, the surface structure or selected outer edge profile of the pot is selected to increase the strength of the joining between the sealed edges and the frame structure provided in the second molding step.

In accordance with an embodiment of the method of the invention, the method further comprises arranging a stabilizing element onto the media pack. The stabilizing element is arranged to cover substantially the whole filtering area of the media packs, and to provide stabilization along the edges of the media pack.

In accordance with an embodiment of the method of the invention, the stabilizing element is arranged on the media pack prior to the step of curing the first molding layer. Further, when an outer frame of the stabilizing element is arranged to substantially extend along a corresponding outer edge of the media pack, which edge is an open end thereof, that frame element of the stabilizing element is sealed together with the open end in the first molding step, which is advantageous. The media pack and the stabilizing element then form a self sustained filter unit.

In accordance with an embodiment of the method of the invention, it further comprises providing the second molding compound layer in at least one further frame element of the frame structure, such that at least one closed end of the at least one media pack is embedded in the second molding compound layer, and curing the second molding compound layer. Thereby the tightness of the seal of the filters against the frame structure is further improved.

In accordance with a second aspect of the present inventive concept, there is provided a filter assembly for removing particles from an air stream comprising: at least one media pack which is pleated, and having opposing first and second open ends. The filter assembly further comprises a frame structure into which the at least one media pack is arranged. The first and second open ends of each media pack are sealed by means of a first sealing layer arranged to embed the open ends thereby forming sealed edges of the media pack. The filter assembly comprises at least one second sealing layer arranged at at least one frame element of the frame structure, which second sealing layer is arranged to embed at least one sealed edge of the media pack, thereby securing and sealing the media pack to the filter element. The double sealing layer arrangement of the present filter assembly provides a secure sealing of the filters to the filter structure, which requires less molding compound material, and which ensures a reliable joining between the media pack and the frame structure.

In accordance with an embodiment of the filter assembly of the invention, each sealed edge of the media pack further comprises a respective pot which is adapted to receive at least the open end of the media pack and which is secured to the media pack by means of the first sealing layer, which is advantageous as described above.

In accordance with an embodiment of the filter assembly of the invention, the second sealing layer is arranged at at least one further frame element of the frame structure to embed at least one closed end of the at least one media pack, thereby securing and sealing the media pack to the further frame element, which provides an improved joining of the filters against the frame structure.

In accordance with an embodiment of the filter assembly of the invention, it further comprises a stabilizing element arranged onto each media pack, which is advantageous as described above.

In accordance with an embodiment of the filter assembly of the invention, frame elements of the stabilizing element extending along an open end of the filter media pack are sealed by the first sealing layer, such that the filter media pack and the stabilizing element form a separate filter unit which after curing of the first sealing layer is arranged in the frame structure.

In accordance with an embodiment of the filter assembly of the invention, it further comprises at least one spacer element for providing a distance between the sealed edge and the frame structure. The spacer elements may optionally be arranged directly on the sealed edge itself, as illustrated in FIG. 2c), or as part of the surface of the frame structure element that faces the sealed edge (not shown). The spacer elements facilitate assembling of the filter assembly by centering the filters in the frame structure, and keeping the filters in place before the second molding step is performed. Further, the spacer elements ensure that the second molding compound material can flow in between the sealed edge and the frame structure to sufficiently embed the sealed edge before curing. Further, the spacer elements provide an increased bonding surface between the sealed edges and the frame structure, thereby increasing the strength of their mutual joining.

In accordance with an embodiment of the filter assembly of the invention, when comprising multiple media packs, the multiple media packs are stacked in the frame structure in a V-orientation, which allows a large number of media packs (providing a large total filtering area) to be mounted in a relatively small space, thereby providing less friction with respect to the air flowing through the filter assembly, and therefore an increase in the filter assembly application life time.

In accordance with an embodiment of the filter assembly of the invention, it further comprises guiding tracks arranged in at least one frame element, and being arranged to orient the media packs in predetermined directions. The guiding tracks may be arranged to form a V-orientation of the stacked multiple media packs.

Further objects and advantages of the present invention will be discussed below by means of exemplifying embodiments. These and other features, aspects and advantages of the invention will be more fully understood when considered with respect to the following detailed description, appended claims and accompanying drawings.

BRIEF DESCRIPTION OF THE DRAWINGS

The invention will now be described in more detail and with reference to the appended drawings in which:

FIG. 3 is a flow chart schematically illustrating embodiments of a method for manufacturing a filter assembly according to the invention.

DESCRIPTION OF PREFERRED EMBODIMENTS

Embodiments of the invention generally provide a filter assembly and a method for manufacturing such a filter assembly. The filter assembly comprises filter media packs arranged in a frame structure, in which the filter media packs are arranged having individual sealing elements disposed on opposite open ends of the respective filter media pack by means of a first molding step during manufacturing of the filter assembly, and for which filter assembly the individual sealing elements of the filter media packs are further arranged having a second sealing element in which the individual sealing elements are embedded by means of a second molding step, thereby sealing and fixating the filter media packs to the frame structure.

Figure 1A:
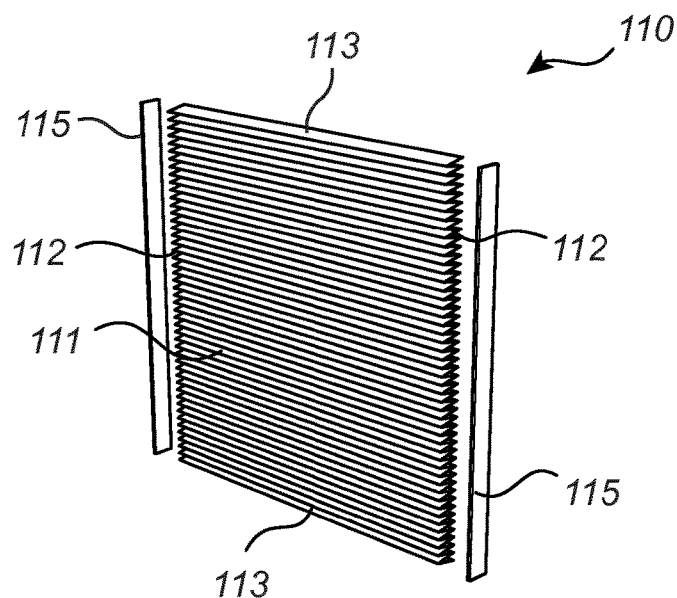
FIG. 1a) is a schematic exploded view of a filter of an embodiment of a filter assembly according to the invention, and 1b) is a perspective exploded view, and c) is a perspective view, respectively, of an embodiment of a filter assembly according to the invention, FIG. 2a)-2f) are schematic cross-sectional close up views illustrating embodiments of a filter assembly according to the invention.

Shown in FIG. 1a) is an exploded perspective view of a filter 110 of an embodiment of the filter assembly according to the present invention. The filter 110 comprises a rectangular pleated media pack 111, having opposing first and second open ends 112, and opposing first and second closed ends 113. The media pack 111 is fabricated from a sheet of filter media, made of e.g. a fiberglass sheet, or a nonwoven polyester sheet, which is pleated to increase the effective filtering area of the filter body.

In accordance with the present invention, the filter 110 is at its open ends 112 further provided with a respective sealing element 115 extending along the open ends 112 thereof, and which sealing element 115 is further arranged to embed the open ends 112 of the media pack 111. Thereby, sealed edges of the media pack 111 are formed. Embodiments of the sealing element 115 will be explained in greater detail herein under with reference to FIGS. 2 and 3.

Figure 1B:
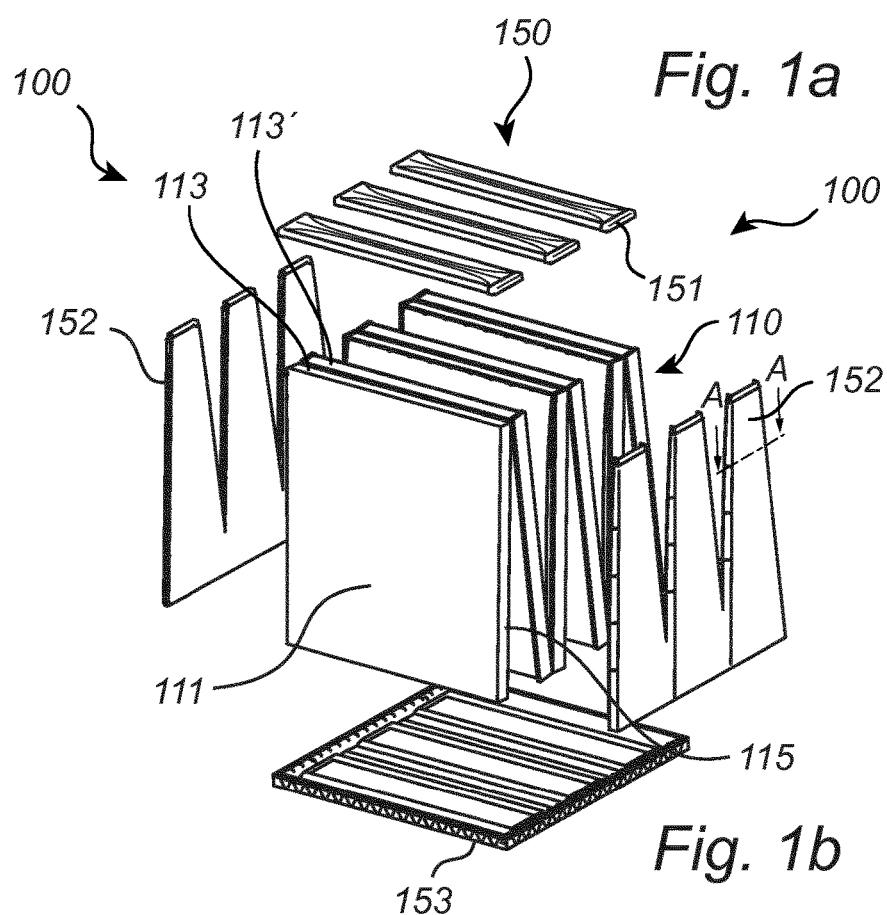
Figure 1C:
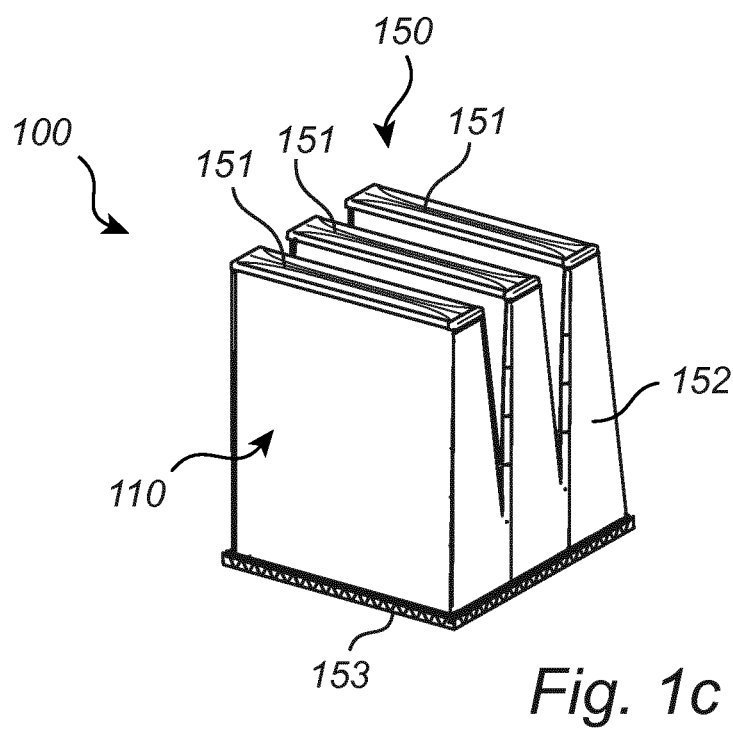

FIG. 1 b) is an exploded view of an embodiment of a filter assembly 100 of the present invention, and FIG. 1c) is an illustration of the same embodiment when assembled. The filter assembly 100 includes a frame structure 150, and six filters 110 arranged in the frame structure 150. The frame structure 150 is here a frame assembly comprising a plurality of frame elements: side panels 152, a top panel 153, and three bottom panels 151. The filters 110 are stacked in a repeated V-structure within the frame structure 150, having their opposite sealed edges 115 arranged facing a respective side panel 152, while at least one of the closed ends 113 of each stacked filter 110 bare against the closed end 113' of an adjacent filter 110' to form the V-structure. The opposite closed ends 113 of the filters 110 are arranged facing the top panel 153 and one of the bottom panels 151, respectively. Further, when the filter assembly is mounted, the sealed edges formed by the sealing elements 115 and the closed ends 113 of the filters are sealed against the frame elements 151, 152, 153 of the frame structure 150, such that substantially all of the air passing through the filter assembly will pass through the media packs 111 of the filters 110. Typically the air enters the filter assembly 100 via the top panel 153 and exits the filter assembly 100 at the bottom panels 151, although the opposite direction of the air flow is possible depending on the orientation of the filter assembly when installed in an air filtering system.

It should be noted that the frame structure may be provided as a single piece, or contain other types and shapes of frame elements. For instance when having a cylinder shaped media pack (which has two opposite open ends, but no closed ends) the frame structure may contain merely one top panel and one bottom panel. The frame structure is preferably made of Acrylonitrile Butadiene Styrene (ABS) polymer or any other applicable thermosetting polymer like e.g. Polystyrene (PS), or Polypropylene (PP). Other applicable materials depending on application are sheet metal, medium density fiberboard (MDF), combinations of sawdust and polymers etc. The frame structure may further be electrically conducting.

The mounting of a filter assembly according to the present invention will now be described with reference to FIGS. 2 and 3 (taking as an exemplifying filter assembly the filter assembly 100, as described above). FIG. 3 is a flow chart illustrating embodiments of the method for manufacturing a filter assembly according to the present invention, and FIG. 2 shows cross sectional close up views of embodiments of a filter assembly according to the invention. The method begins at step S300 by providing at least one media pack. In step S310, each provided media pack is provided with a sealing element on its respective open ends, by means of a first molding step, such that sealed edges of each media pack are obtained. In one embodiment of the method, step S310 comprises, referring now to FIG. 2a) providing sealed edges by adding a respective sealing layer 115, i.e. sealing element, to the open ends 112 of the media pack 111 of the filter 110. The sealing layer 115 is obtained by providing a molding compound, like a polymer material in a liquid or tixotrop phase, in which polymer material the open end 112 is emerged and which polymer is subsequently allowed to cure to provide the sealing layer 115. The polymer material may be a foamed adhesive or other polymer material which is provided over the open ends 112 of the media pack 111 by means of for instance molding or melting.

In step S320 of the method, the media packs, which now are provided with the sealing layer, are arranged in the frame structure, and in a second molding step, represented by step S330, the sealed edges of the media packs are secured and sealed against the frame structure. In the embodiment in FIG. 2a), after curing of the sealing layer 115, step S310 in FIG. 3, the filter 110 is arranged in the side panel 152, step S320 in FIG. 3, by emerging the sealed edge and thereby the sealing layer 115 in a receiving opening 152a of the side panel 152. In the second molding step, step S330 in FIG. 3, a second molding compound layer 162 is provided in the receiving opening 152a, such that the sealing layer 115 is at least partly embedded in the second molding layer 162. The second molding layer 162 is then allowed to cure. According to an embodiment of the invention, the second molding compound layer 162 is a liquid adhesive material provided in the frame element, here the side panel 152, before the sealed edge provided by the sealing layer 115 of the media pack 111 is emerged therein. Alternatively, the sealed edge of the media pack 111 is arranged in the side panel 152, and subsequently a sufficient amount of adhesive is added to the side panel 152 to embed the closed edges in the formed adhesive layer 162.

The latter is favorable for instance when the filters and the frame structure are pre-mounted e.g. by utilizing snap fit connections, and subsequently provided with the second sealing layer.

Figure 2A:
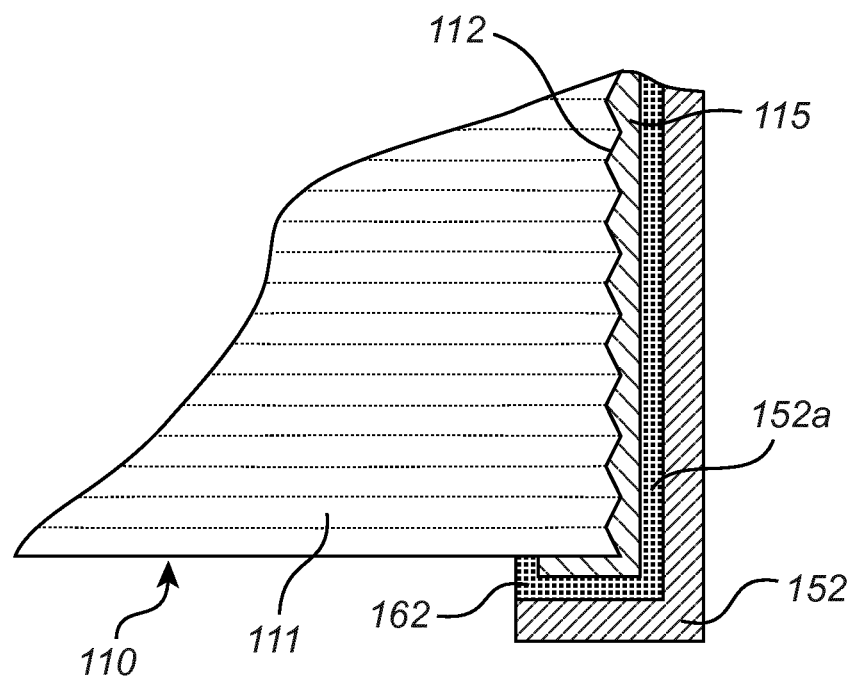
Figure 2B:
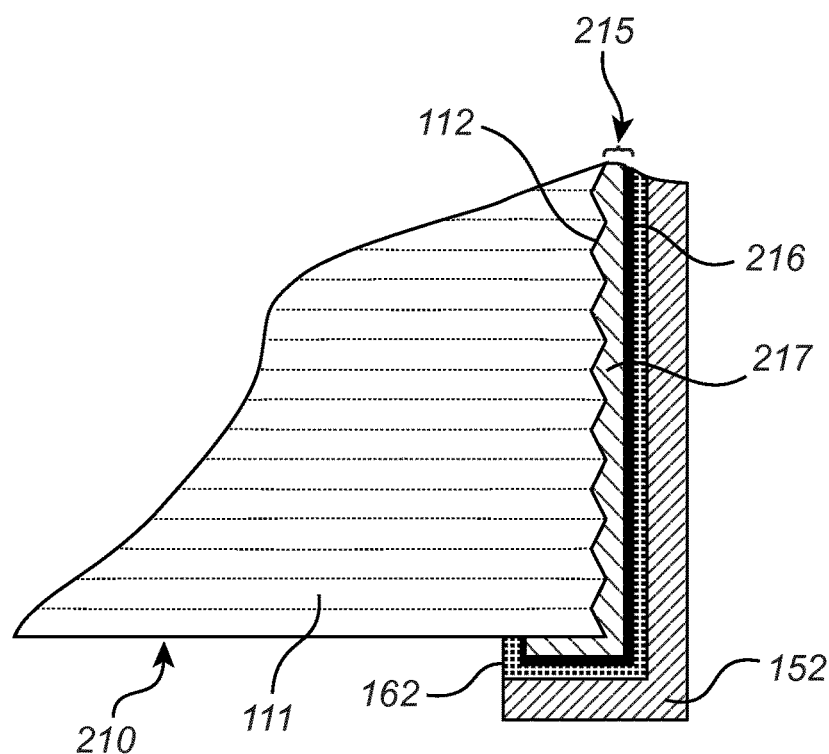
Figure 2C:
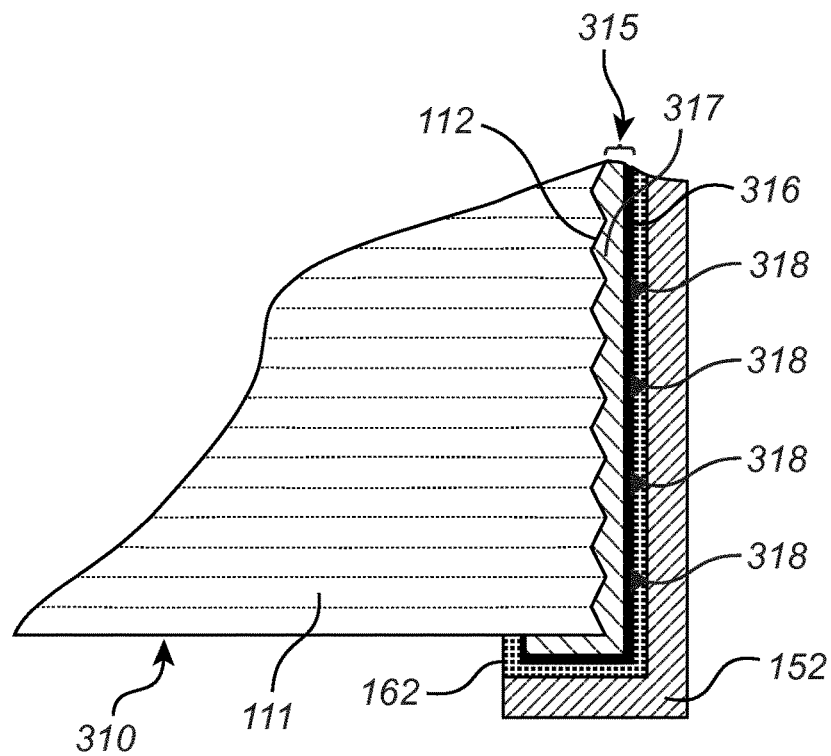

According to an embodiment of the method, and as illustrated in the corresponding filter assembly illustrated in FIG. 2b), before the first molding step, step S310 in FIG. 3, an additional step S301: providing a pot 216 adapted to receive the open end 112 of the media pack 111, is added to the method. Subsequently, the sealing element 215 is formed by arranging a first molding compound layer 217 in the pot 216 such that the open end 112, when emerged in the pot 216, is embedded in the first molding compound layer 217. The first molding compound layer 217 is then cured such that the open end 112 of the media pack 111 is sealed and fixated in the pot 216.

A pot as used herein is a receptacle adapted to receive at least an open end of the pleated media pack, and the molding compound layer in which the open end of the pleated media pack is embedded. The pot may be constructed from any suitable material, such as galvanized steel, aluminum, brass, carbon steel, or injection molded plastics such as high density polyethylene, polypropylene, nylon, polyvinylchloride, Acrylonitrile Butadiene Styrene (ABS), or Polystyrene (PS).

Preferably, the first molding compound layer 217 is a liquid adhesive material provided into the pot 216 before the open end 112 of the media pack 111 is emerged therein. Alternatively, the open end 112 of the media pack 111 is arranged in the pot 216 and subsequently a sufficient amount of adhesive is added to the pot 216 to embed the open end 112 in the formed adhesive layer 217.

According to an embodiment of the filter assembly, the pot is arranged having spacer elements arranged at a sealed edge of the at least one media pack, or at a frame element surface facing a sealed edge of the at least one media pack. To ensure that the adhesive or other suitable molding compound flows around and under the sealed edge, spacer elements 318 as illustrated in the embodiment shown in FIG. 2c) are arranged on the surface of the pot 316 which faces the frame element, side panel 152. The spacer elements may optionally be arranged on a surface of a frame structure that faces the sealed edge (not shown).

Figure 2D:
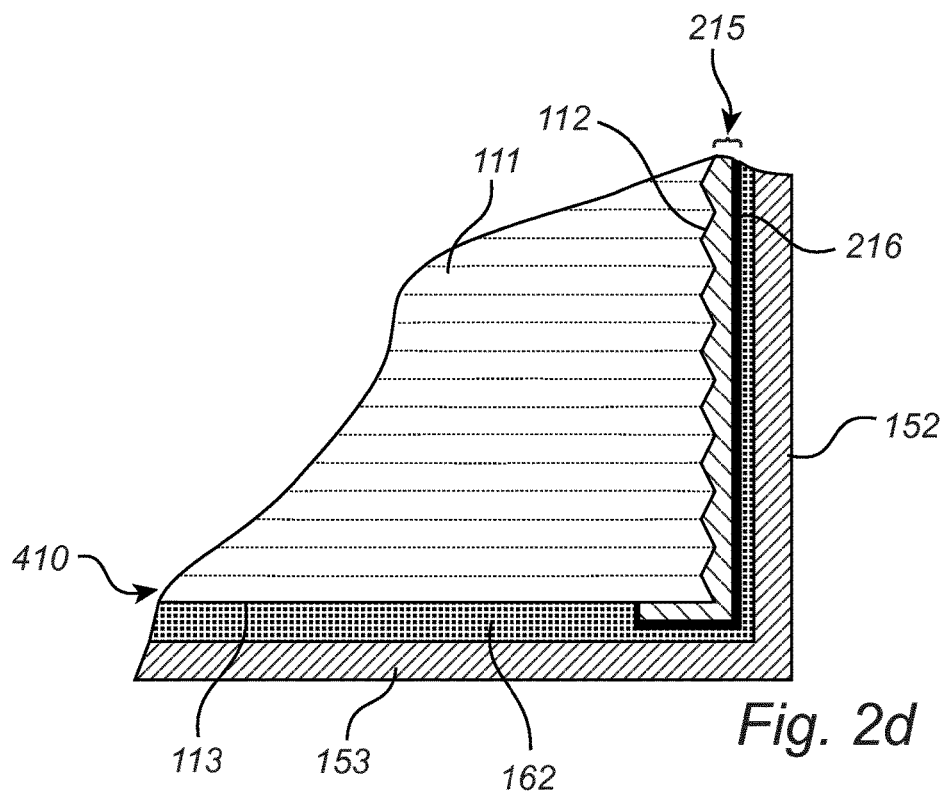
Figure 2E:
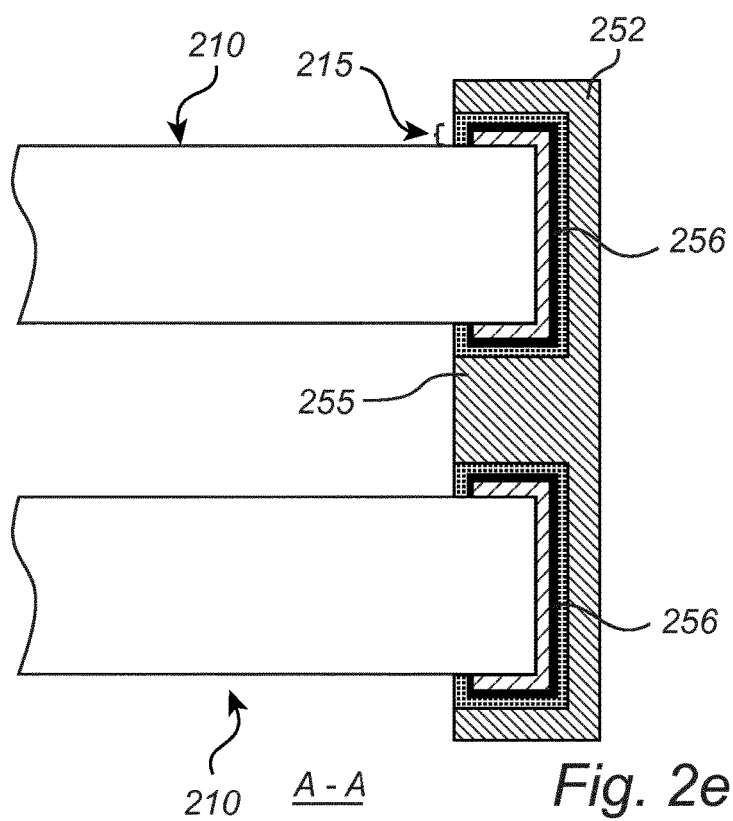

According to an embodiment of the method, as illustrated for the filter assembly shown in FIG. 2d), the second molding step, step S330, further comprises providing the second molding compound layer 162 in at least one further frame element, here front panel 153, which is thereby connected to the side panel 152, of the frame structure 150, such that at the closed end 113 of the media pack 111 is embedded in the second molding compound layer 162. When curing the second molding compound layer 162, the closed end 113 of the media pack is efficiently sealed and fastened to the frame structure.

To facilitate assembling of the filters and the frame structure, in embodiments of the invention, the frame structure is at surfaces facing the filter sides provided with guiding tracks or protrusions to facilitate the positioning of the filters with respect to the frame structure. An example is given in FIG. 2 e), which shows a cross section A of a filter assembly as illustrated in FIGS. 1b) and 1c), in which filters 210 are arranged in a side panel 252, provided with receiving tracks 256 in which the sealed edges of the filters 210 are emerged and sealed and fixated in the second molding step. The receiving tracks 256 are formed by protruding tracks 255 arranged in the surface of the side panel 252 which faces the filters 210.

According to an embodiment of the method, in an optional step S302, before performing the first molding step S310, a stabilizing element is arranged on the media pack to improve the strength of the media pack. This is illustrated in FIG. 2f), which shows a cross section A of a filter assembly as illustrated in FIGS. 1b) and 1c), in which two filters 510 are arranged in a frame element, here side panel 152. The media packs 111 are, preferably before being emerged in a pot 516 in the first molding step S310, provided with a stabilizing element 154, which is emerged together with the media pack 111 into the first molding compound layer 517, and subsequently fixated and sealed within the sealed edge, i.e. with the sealing element 515 formed in the first molding step S310.

The stabilizing element may be designed to substantially cover the filtering area of the media pack. Any frame element of the stabilizing element which extends along the open end of the media pack may then be sealed in the first molding step. Any frame element of the stabilizing element which extends along a closed end of the media pack may be sealed and fastened to the frame structure in the second molding step.

Preferably the molding compound used in the first and/or second molding step is selected from suitable single or multi-component materials which can be dispensed as a liquid and subsequently be hardened, i.e. cured, such as a material chosen from a group consisting of polyvinylchloride plastisols, polyurethanes epoxies, silicones and ceramics.

Although the filter assembly 100 illustrated in the Figures herein incorporates a plurality of beneficial features, it is contemplated that the invention may be beneficially incorporated in other filter assemblies having different configurations, like differently arranged filter media packs, a single media pack, differently arranged frame structure, additional elements etc. Different filter media pack materials are applicable depending on the specific filter application. The filter media preferably comprises fibers of glass, polymers, or cellulose, or a combination thereof, and may be a woven or nonwoven fabric, e.g. nonwoven needle felt. The filter media may be spunbonded, air-laid, dry-laid, wet-laid, spunbonded, melt-blown, or electro-spun fabrics. The filter media may further be impregnated for instance to make the filter waterproof, or made electrically conductive.

The invention claimed is:

1. A method for manufacturing a filter assembly for removing particles from an air stream, the filter assembly including at least one media pack in a frame structure, the at least one media pack being pleated and having a first open end and a second open end, the first open end and the second open end being opposing open ends, the method comprising:
    performing a first molding operation to seal the first open end and the second open end of the at least one media pack to establish a sealed first edge and a sealed second edge of the at least one media pack, respectively, the first molding operation including performing, for each open end of the first open end and the second open end,
        coupling the open end and a first molding compound layer to a pot, such that the open end is embedded in the first molding compound layer and the pot at least partially encloses the first molding compound layer and the open end, and
        curing the first molding compound layer; and
    performing a second molding operation to secure and seal the sealed first edge and the sealed second edge of the at least one media pack to at least one frame element of the frame structure, respectively, such that the pots of the sealed first edge and the sealed second edge are each secured and sealed to at least one frame element of the frame structure, respectively.

2. A method according to claim 1, further comprising:
    coupling a stabilizing element to the at least one media pack.

3. A method according to claim 2, further comprising:
    coupling the stabilizing element to the at least one media pack prior to curing the first molding compound layer, such that
        the stabilizing element substantially covers a filter area of the at least one media pack,
        at least one frame element of the stabilizing element extends along an open end of the at least one media pack, and
        the at least one frame element is at least partially sealed based on sealing the first open end and the second open end of the at least one media pack.

4. A method according to claim 1, wherein the second molding operation includes performing, for each sealed edge of the sealed first edge and the sealed second edge,
    coupling the sealed edge, and a second molding compound layer to at least one frame element of said frame structure, such that the sealed edge is embedded in the second molding compound layer and the at least one frame element at least partially encloses the second molding compound layer and the sealed edge; and
    curing the second molding compound layer.

5. A method according to claim 4, further comprising:
    coupling the second molding compound layer to at least one additional frame element of the frame structure, such that at least one closed end of the at least one media pack is embedded in the second molding compound layer.

6. A filter assembly comprising:
    at least one media pack which is pleated, the at least one media pack including a first open end and a second open end, the first open end and the second open end being opposing open ends, the at least one media pack further including a sealed first edge and a sealed second edge, each sealed edge of the sealed first edge and the sealed second edge including,
a first sealing layer,
a separate, respective open end of the first open end and the second open end embedded in the first sealing layer, and
a pot that at least partially encloses the first sealing layer in which the separate, respective open end is embedded, such that the pot is secured to the at least one media pack by the first sealing layer; and
a frame structure coupled to the at least one media pack, such that the frame structure at least partially encloses the at least one media pack; and
at least one second sealing layer coupled to at least one frame element, at least one sealed edge of the sealed first edge and the sealed second edge embedded in the at least one second sealing layer, such that the at least one media pack is secured and sealed to the at least one frame element.

7. A filter assembly according to claim 6, wherein the at least one second sealing layer is coupled to at least one additional frame element of the frame structure, at least one sealed edge of the sealed first edge and the sealed second edge is embedded in the at least one second sealing layer, such that the at least one second sealing layer secures and seals the at least one media pack to the at least one additional frame element.

8. A filter assembly according to claim 6, further comprising:
a stabilizing element coupled to the at least one media pack.

9. A filter assembly according to claim 8, wherein at least one frame element of the stabilizing element extends along an open end of the at least one media pack and is at least partially sealed by the first sealing layer.

10. A filter assembly according to claim 6, further comprising:
at least one spacer element on one of
a sealed edge of the at least one media pack, or
a frame element surface facing a sealed edge of the sealed first edge and the sealed second edge of the at least one media pack.

11. A filter assembly according to claim 6, wherein,
the at least one media pack includes a plurality of media packs, and
the plurality of media packs are stacked in the frame structure in a V-orientation.

12. A filter assembly according to claim 6, further comprising:
a set of guiding tracks in at least one frame element, the set of guiding tracks configured to orient the at least one media pack in a particular direction.

* * * * *